3,111,414
METHOD OF TREATING A TITANATE
DIELECTRIC BODY
Wilhelm R. Buessem, Spring Mills, Pa., Katrine Seip Forland, Trondheim, Norway, and Paul A. Marshall, Jr., Boalsburg, Pa., assignors to the United States of America as represented by the Secretary of the Army
No Drawing. Filed Feb. 2, 1962, Ser. No. 170,846
7 Claims. (Cl. 106—39)

This invention relates in general to the method of treating ceramic dielectric bodies in a controlled fluoride atmosphere supplied by hydrogen fluoride, and particularly to the method of treating a barium titanate dielectric body in a controlled fluoride atmosphere supplied by hydrogen fluoride at temperatures of about 1300° C. to 1450° C., and to barium titanate dielectric bodies so treated.

Ceramic dielectric bodies possessing high dielectric constant, suitably low power factor, high breakdown strength and favorable resistance properties are in demand for certain uses which require favorable combinations of electrical characteristics. One such use is for a fixed ceramic dielectric capacitor for operation over wide temperature ranges up to 200° C., and which has a life greater than 3000 hours under working stresses of 60 volts per mil.

Work done heretofore has indicated that the incorporation of metallic fluorides into the raw barium titanate prior to vitrification will improve some of the electrical properties of the subsequently fired barium titanate. This type of metallic fluoride addition, however, does not work where one is interested in the development of high dielectric constant ceramic materials having a long life, that is, a life greater than 3000 hours under working stresses of 60 volts per mil and at temperatures up to 200° C.

In general, the objective of this invention is to develop a method of treating ceramic dielectric bodies so that the treated bodies will possess a long working life and high volume reistivity under conditions of high temperature and high D.C. voltage. A more specific object is to develop a method of treating a barium titanate dielectric body so that the body can be used as a fixed ceramic dielectric capacitor for operation over wide temperature ranges up to 200° C., and which has a life greater than 3000 hours under working stresses of 60 volts per mil.

It has now been found that the above objectives can be attained by treating ceramic dielectric bodies as, for example, a barium titanate dielectric body in a controlled fluoride atmosphere supplied by hydrogen fluoride at temperatures of about 1300° C. to 1450° C. until the treated bodies attain (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The aging rate of the treated barium titanate dielectric bodies is improved by a factor up to 800 percent without adverse effect on the dielectric constant and temperature stability of the barium titanate body.

The Munsell Color System, as embodied in the Munsell Book of Color published by Munsell Color Co., Inc., copyright date 1929, defines, explains, and illustrates the fundamental characteristics of color and is commonly used as a standard for the identification or specification of color.

By the term "a controlled fluoride atmosphere," a particular concentration of fluoride or range of fluoride concentration is not intended. Such concentration would, practically speaking, be an extremely difficult quantity to measure at every step of the treatment. Moreover, it has been found that the important factor in the treatment is the amount of fluoride with respect to the nature and size of the particular vessel in which the barium titanate dielectric body is being treated and not the amount of fluoride with respect to the quantity of samples to be treated. The amount of fluoride present at all times with respect to the nature and size of the particular vessel in which the barium titanate dielectric body is being treated can be controlled by the operator during the treatment. The operator must maintain a sufficient fluoride level so that adequate protection against fluoride attack is provided for the lining of the particular vessel in which the barium titanate body is being treated. In some instances, this level of fluoride can be advantageously maintained by conditioning the lining of the vessel prior to or during the treatment of the barium titanate body with a fired charge composed of hydrogen fluoride and an oxide of titanium. In other instances, conditioning of the lining of the vessel is not required. In any case, the operator must maintain a sufficient fluoride level so that the treated barium titanate bodies attain (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System.

The following examples illustrate the treatment of a typical high dielectric constant ceramic dielectric body, to wit, barium titanate, in a controlled fluoride atmosphere according to the invention.

*Example 1.*—A furnace was built of insulating brick, laid up without a binder and with staggered joints to reduce heat loss by direct radiation. The cavity was 7 inches wide, 12½ inches long, and 4½ inches deep, through which four globars were placed longitudinally at the corners and approximately ¾ inch from the cavity walls. A channel ⅜ inch by 1½ inch in the floor of the furnace was formed by installing refractory fillers on each side. The channel was for the purpose of guiding the slabs on which material was placed for fluorination. In the case of continuous fluorination, the slabs were introduced into the furnace through a 1 inch by 1½ inch slot at one end and removed through a similar slot at the opposite end. In the case of static firing, the slots were simply closed by placing a refractory across the opening. Four Delta Globars 26 inches in length by $\frac{7}{16}$ inch in diameter with a 12 inch heating zone served as the heating elements.

In the continuous fluorination treatment, the above described furnace is first conditioned so that it contains an atmosphere of sufficient fluoride level to react with the titanate bodies as they are introduced as well as to properly condition the furnace lining against fluoride attack. Conditioning of the furnace is carried out in the following manner. Twenty grams of titanium dioxide are thoroughly mixed with twelve grams of 52 percent by weight hydrogen fluoride in a polyethylene beaker until a thick paste is formed. The mixture is allowed to react and is then placed on a refractory slab and inserted into the furnace at 1450° C., and allowed to remain there for 30 minutes. Sample discs of barium titanate placed on refractory slabs covered with zirconia powder are then started through the tunnel kiln at the rate of ¼ inch per minute. After 288 minutes the declining fluoride atmosphere in the furnace is restored by introducing a slab containing 4.8 grams of titanium dioxide plus 2.88 grams of 52 percent by weight hydrogen fluoride and at the same rate of ¼ inch per minute. Thereafter, every 180 minutes a like amount of hydrogen fluoride is introduced, which maintains a sufficient fluoride level for reaction with the titanate bodies. The treated discs on emerging from the furnace are characterized by (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as capacitor dielectrics over wide temperature ranges and have a life greater than 3000 hours under working stresses of 60 volts per mil at 200° C. An untreated barium titanate disc subjected to working stresses of 60 volts per mill at 200° C. had a life of less than one minute.

*Example 2.*—Using the same furnace as described in Example 1 above, successful fluorination is obtained by a static method. The furnace is "conditioned" as in Example 1 and then allowed to cool to room temperature. Several monitoring sample discs of barium titanate are then placed in the furnace and fired to 1450° C. for one hour with the furnace closed. The samples are then examined, after cooling, to determine the degree of fluorination, their color being the best indicator. If there is too high a level of fluorine in the furnace, the sample discs are blue green in color and new monitoring samples are again fired. Monitor firing is continued until the samples become yellow. The furnace is then ready for fluorination of barium titanate discs which are fired for one hour. It is possible to repeat a firing as many as three times under these conditions without adding fluorine as the furnace maintains a sufficient fluoride level for some time. It is found that the number of samples being fluorinated makes little or no difference and that the degree of fluorination is dependent only on the fluoride level maintained in the furnace. The treated discs are characterized by (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as a capacitor dielectric over wide temperature ranges and have a life greater than 3000 hours under working stresses of 60 volts per mil at 200° C.

*Example 3.*—Successful fluorination is also obtained in a furnace similar to that described above but with a somewhat larger cavity. This is done by placing the barium titanate discs in alumina saggers covered with zirconia powder with tight fitting lids. It is found unnecessary to condition the furnace when using this method. The alumina saggers are 50 millimeters in diameter by 12 millimeters high. Six barium titanate discs are placed in the sagger along with one barium titanate disc which contains 5.0 mole percent of hydrogen fluoride and are sent through the furnace at the rate of ¼ inch per minute at 1450° C. The disc containing hydrogen fluoride acts as the donor for the fluorination process thus conditioning the inside of the sagger. The treated discs are characterized by (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as capacitor dielectrics over wide temperature ranges and have a life greater than 3000 hours under working stresses of 60 volts per mil.

*Example 4.*—An alumina tube is closed to the atmosphere and gaseous hydrogen fluoride is fed into one end of the tube and discharged at the other. The alumina tube is 2 inches in diameter by 30 inches in length, open at one end and tapered to a ⅛ inch opening at the other. At the open end, a similar tube of smaller diameter is inserted into the larger tube. The two tubes are sealed with wax leaving a sealed tube with ⅛ inch openings at each end. The tube is then inserted into a refractory furnace with both ends protruding through the furnace, the discharge end of the tube being cooled with a copper coil wrapped around the tube and cooling water allowed to pass through the coil in order to preserve the wax seal. Barium titanate discs are then placed on refractory slabs covered with zirconia powder, or in a platinum boat, in the center of the tube. The temperature in the furnace is then raised to 1450° C. and held for 20 minutes while a flow of 10 percent hydrogen fluoride gas in dry air is piped directly to the inlet side and through the tube to a bubble counter on the outside to measure the flow of gas. The treated discs are characterized by (a) a resistivity up to 200,000 megohm centimers as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as capacitor dielectrics over wide temperature ranges and have a life greater than 3000 hours under working stresses of 60 volts per mil at 200° C.

*Example 5.*—The alumina tube of Example 4 above is sealed off from the atmosphere and fluorination obtained by having the tube in a state of conditioning as was discussed in Example 2 above. The discs are then fired at 1450° C. for one hour so as to be characterized by (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as capacitor dielectrics over wide temperature ranges and have a life greater than 3000 hours under working stresses of 60 volts per mil.

*Example 6.*—The same furnace as was used in Example 1 is conditioned with a mixture of hydrogen fluoride and barium titanate (approximately 50–50 by volume) in the form of a paste and contained in a platinum crucible. The mixture is then placed in the furnace and slowly heated to 1300° C. to 1400° C. On cooling, the furnace is ready for firing barium titanate discs containing fluoride and prepared in the following manner. Additions of 1, 5, 10, and 15 mole percent hydrogen fluoride are made to barium titanate by thoroughly mixing a calculated amount of 48 percent hydrogen fluoride with the barium titanate in a platinum crucible followed by drying at 150° C. The mix is then crushed, screened, and pressed into one inch diameter discs, at approximately 5000 pounds per square inch. The discs are then placed on refractory slabs covered with zirconia powder and fired in the conditioned furnace at 1300° C. to 1400° C. for one hour. The treated discs are characterized by (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System. The treated discs are well suited for use as capacitor dielectrics over wide temperature ranges and have a life greater than 3000 hours under working stresses of 60 volts per mil. The conditioning operation above is believed necessary to prevent excessive removal of hydrogen fluoride from the same as a result of formation of silicon tetrafluoride at the refractory face or at the hot globar face which in turn would lower the hydrogen fluoride vapor pressure over the samples.

The temperatures of treatment shown in Examples 1 through 6 are applicable to the treatment of barium titanate when the treatment is simultaneous with the firing of the raw body. However, treatment with hydrogen fluoride can be accomplished after the bodies have been fired. In this instance, fluorination of the fired bodies can be accomplished at temperatures as low as 800° C. by any of the techniques presented in Examples 1 through 6 above.

Though the foregoing description has been concerned principally with the method of treating barium titanate dielectric bodies, it should be considered that the method is adaptable to the treatment of other high dielectric constant ceramic dielectrics. It should also be considered that the method is applicable to the treatment of the various commercially available barium titanates that contain additives therein. Some of the typical additives to commercially available barium titanates to which the method of treatment of this invention is applicable are in percent by weight of the barium titanate, 2 to 64 percent calcium titanate, 4 to 15 percent strontium titanate, 3 to 14 percent barium zirconate, 3 percent nickel stannate, 10 to 15 percent bismuth stannate, 2 to 10 percent calcium zirconate, 0.5 to 1.0 percent magnesium zirconate, 5 to 17 percent bismuth titanate, 10 percent bismuth zirconate, 4 percent antimony oxide, 0.2 to 0.3 percent cerium oxide, 0.2 to 0.3 percent cobalt chloride, 0.4 to 0.5 percent nickel oxide, 0.5 to 1.0 percent iron oxide, 0.2 percent zirconium oxide, 0.5 percent titanium oxide, and 0.2 percent ammonium hydroxide.

What is claimed is:

1. The method of introducing fluoride into a barium titanate dielectric body comprising heating the barium titanate body at 1300° C. to 1450° C. in a controlled fluoride atmosphere supplied by hydrogen fluoride until the sample treated attains (a) a resistivity up to 200,000 megohm centimeters as measured at 200° C. under a working stress of 2.5 volts per mil, (b) an amount of fluorine about 0.1 percent by weight of the treated body, and (c) a hue of 5.0 Y to 7.5 Y, a value of 7 to 8, and a chroma of 4 according to the Munsell Color System.

2. The method according to claim 1 wherein the fluoride is introduced into the barium titanate body in an insulating brick furnace which has been conditioned by firing a charge composed of hydrogen fluoride and an oxide of titanium therein.

3. The method according to claim 2 wherein the barium titanate dielectric body is moved through the furnace during the introduction of fluoride to the body with periodic reconditioning charges of hydrogen fluoride-titanium dioxide paste.

4. The method according to claim 2 wherein the barium titanate dielectric body remains static within the furnace during the introduction of fluoride to the body.

5. The method according to claim 1 wherein the fluoride is introduced into the barium titanate body by placing the barium titanate bodies to be treated and a barium titanate body containing hydrogen fluoride in an alumina sagger covered with zirconia powder with tight fitting lids, the covered alumina sagger then being passed continuously through a furnace.

6. The method according to claim 1 wherein the fluoride is introduced into the barium titanate dielectric body in an alumina tube inserted into a refractory furnace with both ends of the tube protruding through the furnace wherein a mixture of hydrogen fluoride gas in dry air is caused to flow from the inlet end of the tube through the outlet end of the tube to supply the controlled fluoride atmosphere.

7. The method according to claim 1 wherein the fluoride is introduced into the barium titanate dielectric body in an alumina tube inserted into a refractory furnace with both ends of the tube protruding through the furnace and sealed off from the atmosphere during the introduction of fluoride to the body, said introduction of fluoride to the body being caused by conditioning the tube by firing a charge composed of hydrogen fluoride and an oxide of titanium therein.

References Cited in the file of this patent
UNITED STATES PATENTS

| | | |
|---|---|---|
| 2,297,169 | Ross | Sept. 29, 1942 |
| 2,602,753 | Woodcock et al. | July 8, 1952 |
| 2,852,400 | Remeika | Sept. 16, 1958 |
| 2,972,570 | Haas et al. | Feb. 21, 1961 |
| 3,061,461 | Lehovec et al. | Oct. 30, 1962 |